United States Patent
Liu et al.

(10) Patent No.: US 10,899,471 B2
(45) Date of Patent: Jan. 26, 2021

(54) FLIGHT INDICATION APPARATUSES, SYSTEMS AND ASSOCIATED METHODS

(71) Applicant: SZ DJI TECHNOLOGY CO., LTD., Shenzhen (CN)

(72) Inventors: Wanqi Liu, Shenzhen (CN); Huai Huang, Shenzhen (CN); Changxing Zhou, Shenzhen (CN); Qiu Lan, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 231 days.

(21) Appl. No.: 15/993,499

(22) Filed: May 30, 2018

(65) Prior Publication Data

US 2018/0273202 A1 Sep. 27, 2018

Related U.S. Application Data

(63) Continuation of application No. PCT/CN2017/072447, filed on Jan. 24, 2017.

(51) Int. Cl.
*B64D 47/06* (2006.01)
*B64D 47/02* (2006.01)
(Continued)

(52) U.S. Cl.
CPC .............. *B64D 47/06* (2013.01); *B64C 11/00* (2013.01); *B64C 27/00* (2013.01); *B64C 39/024* (2013.01);
(Continued)

(58) Field of Classification Search
CPC ..... B64D 45/08; B64D 47/06; B64D 2203/00
See application file for complete search history.

(56) References Cited

U.S. PATENT DOCUMENTS

| 3,723,722 A | 3/1973 | Van Iderstine et al. |
| 5,249,046 A | 9/1993 | Ulich et al. |

(Continued)

FOREIGN PATENT DOCUMENTS

| CN | 201470111 U | 5/2010 |
| CN | 103403577 A | 11/2013 |

(Continued)

OTHER PUBLICATIONS

International Searching Authority, International Search Report and the Written Opinion of the International Searching Authority, PCT Application PCT/CN2017/072447, dated Sep. 6, 2017, 9 pages.

(Continued)

*Primary Examiner* — Philip J Bonzell
*Assistant Examiner* — Tye William Abell
(74) *Attorney, Agent, or Firm* — Finnegan, Henderson, Farabow, Garrett & Dunner, LLP (57) ABSTRACT

Systems, apparatuses and methods for indicating a moveable device such as an unmanned aerial vehicle (UAV) are disclosed herein. The present technology provides an illumination system having a light source and an illuminating component. In a representative embodiment, the light source is carried by a UAV and positioned to emit a light ray in a first direction. The illuminating component is carried by a propeller of the UAV. The illuminating component can include a light entrance portion, a light transmission portion, and a light exit portion. The light entrance portion is positioned to receive the light ray from the light source, the light transmission portion is positioned to transmit the light ray to the light exit portion, and the light exit portion is positioned to direct the light ray in a second direction so as to form a visual indication corresponding to the UAV.

20 Claims, 10 Drawing Sheets

(51) Int. Cl.
  *B64C 39/02* (2006.01)
  *B64C 11/00* (2006.01)
  *B64C 27/00* (2006.01)
  B64C 11/20 (2006.01)
  G09F 21/10 (2006.01)

(52) U.S. Cl.
  CPC .............. *B64D 47/02* (2013.01); *B64C 11/20* (2013.01); *B64C 2201/024* (2013.01); *B64C 2201/108* (2013.01); *B64C 2201/14* (2013.01); *B64C 2201/165* (2013.01); *G09F 21/10* (2013.01)

(56) References Cited

U.S. PATENT DOCUMENTS

| | | |
|---|---|---|
| 6,101,455 A | 8/2000 | Davis |
| 6,246,258 B1 | 6/2001 | Lesea |
| 6,344,937 B1 | 2/2002 | Sparrold et al. |
| 6,666,855 B2 | 12/2003 | Somani et al. |
| 7,085,400 B1 | 8/2006 | Holsing et al. |
| 7,236,299 B1 | 6/2007 | Smith et al. |
| 7,336,407 B1 | 2/2008 | Adams et al. |
| 7,564,571 B2 | 7/2009 | Karabassi et al. |
| 7,843,448 B2 | 11/2010 | Wheeler et al. |
| 8,224,097 B2 | 7/2012 | Matei et al. |
| 8,396,293 B1 | 3/2013 | Korah et al. |
| 8,488,877 B1 | 7/2013 | Owechko et al. |
| 8,503,046 B2 | 8/2013 | Mikkelsen et al. |
| 8,605,998 B2 | 12/2013 | Samples et al. |
| 8,620,089 B1 | 12/2013 | Korah et al. |
| 8,665,122 B2 | 3/2014 | Klepsvik |
| 8,876,295 B2 | 11/2014 | Scanlon |
| 9,076,219 B2 | 7/2015 | Cha et al. |
| 9,097,804 B1 | 8/2015 | Silver et al. |
| 9,098,753 B1 | 8/2015 | Zhu et al. |
| 9,128,190 B1 | 9/2015 | Ulrich et al. |
| 9,174,733 B1 | 11/2015 | Burgess et al. |
| 9,396,545 B2 | 7/2016 | Fu et al. |
| 9,470,548 B2 | 10/2016 | Ahn et al. |
| 9,984,579 B1* | 5/2018 | Harris ................... H04W 4/021 |
| 2005/0248749 A1 | 11/2005 | Kiehn et al. |
| 2005/0254628 A1 | 11/2005 | Saladin et al. |
| 2009/0015436 A1* | 1/2009 | Lundberg ............... B64D 47/06 340/945 |
| 2009/0310867 A1 | 12/2009 | Matei et al. |
| 2011/0285981 A1 | 11/2011 | Justice et al. |
| 2012/0032541 A1 | 2/2012 | Chen et al. |
| 2012/0121166 A1 | 5/2012 | Ko et al. |
| 2012/0170024 A1 | 7/2012 | Azzazy et al. |
| 2012/0170029 A1 | 7/2012 | Azzazy et al. |
| 2013/0284475 A1 | 10/2013 | Hirabayashi et al. |
| 2013/0329065 A1 | 12/2013 | Haraguchi et al. |
| 2015/0219920 A1 | 8/2015 | Ando et al. |
| 2016/0046388 A1* | 2/2016 | Jha ........................ B64D 47/04 362/470 |
| 2016/0068266 A1* | 3/2016 | Carroll ................... B64D 27/24 244/53 R |
| 2016/0154999 A1 | 6/2016 | Fan et al. |
| 2016/0280368 A1* | 9/2016 | Schoen ................ B64C 27/463 |
| 2016/0311528 A1 | 10/2016 | Nemovi et al. |
| 2017/0152059 A1* | 6/2017 | Peng ...................... B64D 31/00 |
| 2017/0237369 A1* | 8/2017 | Becker .................. B64D 47/02 416/5 |
| 2017/0316701 A1 | 11/2017 | Gil et al. |
| 2018/0061235 A1* | 3/2018 | Goldberg ............. G08G 1/0955 |

FOREIGN PATENT DOCUMENTS

| | | |
|---|---|---|
| CN | 103969637 A | 8/2014 |
| CN | 104463872 A | 3/2015 |
| CN | 104469283 A | 3/2015 |
| CN | 104600902 A | 5/2015 |
| CN | 105217050 A | 1/2016 |
| CN | 105292455 A | 2/2016 |
| CN | 105438439 A | 3/2016 |
| CN | 205060034 U | 3/2016 |
| CN | 105517903 A | 4/2016 |
| CN | 105759253 A | 7/2016 |
| CN | 106019296 A | 10/2016 |
| CN | 106027915 A | 10/2016 |
| CN | 106063089 A | 10/2016 |
| CN | 205813404 U | 12/2016 |
| DE | 10 2014 223 727 A1 | 5/2016 |
| JP | 63194211 A | 8/1988 |
| JP | 2002199682 A | 7/2002 |
| JP | 2005321547 A | 11/2005 |
| KR | 101665938 B1 | 10/2016 |
| WO | 2006086077 A2 | 8/2006 |
| WO | 2015148824 A1 | 10/2015 |
| WO | 2016127357 A1 | 8/2016 |
| WO | 2016170333 A1 | 10/2016 |

OTHER PUBLICATIONS

Aijazi, et al., "Segmentation Based Classification of 3D Urban Point Clouds: A Super-Voxel Based Approach with Evaluation," (2013).
Douillard, et al., "On the Segmentation of 3D LIDAR Point Clouds," (2011).
Hackel, et al., "Fast Semantic Segmentation of 3D Point Clouds with Strongly Varying Density," (2016).
Levinson, et al., "Automatic Online Calibration of Cameras and Lasers," (2013).
Liu, et al., "A 3.9 ps. RMS Resolution Time-To-Digital Converter Using Dual-sampling Method on Kintex UltraScale FPGA," (2006).
Montemerlo, et al., "Junior: The Stanford Entry in the Urban Challenge," (2008).
Palka, et al., "A Novel Method Based Solely on FPGA Units Enabling Measurement of Time and Charge of Analog Signals in Positron Emission Tomography," (2014).
Raismian, "Google Cars Autonomous Driving," (2017).
Schwarze, "A New Look at Risley Prisms," (2006).
Tongtong, et al., "Gaussian-Process-Based Real-Time Ground Segmentation for Autonomous Land Vehicles," (2014).
Wu, et al., "Several Key Issues on Implementing Delay Line Based TDCs using FPGA," (2009).
"Transparent Heavy-Duty Propellers: AlienWii Micro Hubsan Quadcopter Drone," Youtube, XP054979015, Retrieved from Internet at https://www.youtube.com/watch?v=Mo0Xb15NXiA, p. 1, dated Feb. 23, 2015.

* cited by examiner

FLIGHT INDICATION APPARATUSES, SYSTEMS AND ASSOCIATED METHODS

CROSS REFERENCE TO RELATED APPLICATION

The present application is a continuation of International Patent Application No. PCT/CN2017/072447, filed Jan. 24, 2017, which is incorporated herein by reference.

TECHNICAL FIELD

The present technology is directed generally to apparatuses, systems and methods for indicating a moveable device. More particularly, the present technology relates to apparatuses, systems and methods for visually indicating an unmanned aerial vehicle (UAV).

BACKGROUND

Figure 1:
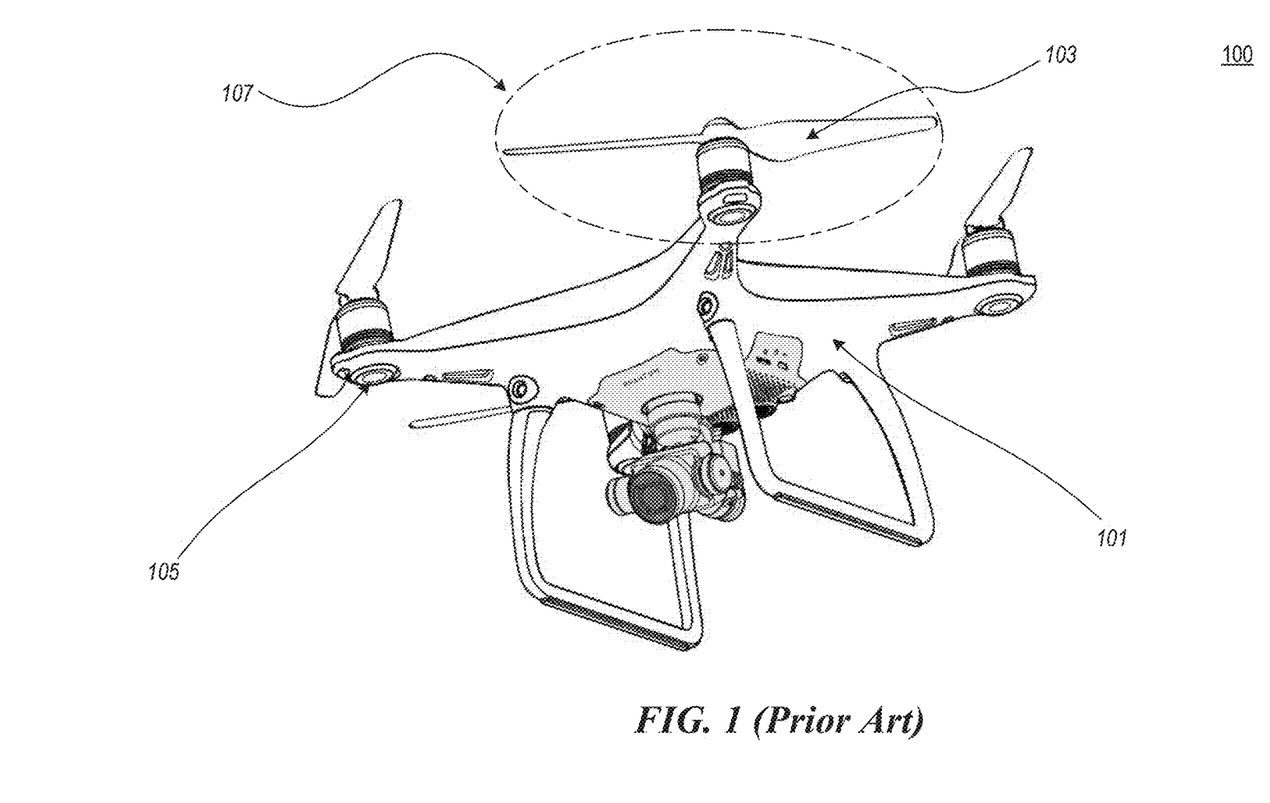
FIG. 1 is an isometric view illustrating a UAV having a conventional indication system.

Knowing the travel direction and/or orientation of a UAV is critical during operation because the operator needs such information to properly control the UAV and avoid potential accidents. As shown in FIG. 1, a conventional UAV 100 includes a main body 101 coupled to a propeller 103. The UAV 100 also includes a traditional indication light 105 positioned in the main body 101 and configured to indicate the head or forward end of the UAV 100. When the UAV 100 is in operation, the propeller 103 rotates and forms a rotational disk 107 which extends beyond the main body 101 of the UAV 100. The traditional indication light 105 is generally a point light source. When the UAV 100 flies high above a user, the user may not clearly see the traditional indication light 105 Therefore, it would be beneficial to have an improved apparatus or system to provide clearer and/or more intuitive indication of the UAV.

SUMMARY

The following summary is provided for the convenience of the reader and identifies several representative embodiments of the disclosed technology. Generally speaking, the present technology provides improved apparatuses, systems and methods that can properly inform an operator regarding a status of a UAV, e.g., when the UAV is in operation. More particularly, the present technology can provide an operator with a clear visual indication of the UAV so as to effectively convey information associated with the UAV status to the operator. For example, the present technology can include an illumination system that has a lighting component and an illuminating component. The illuminating component can include (1) a light entrance portion configured to receive a light ray from the lighting component carried by the UAV; (2) a light transmission portion positioned to transmit the light ray; and (3) a light exit portion positioned to direct the light ray in a different direction. By incorporating the illumination system in a propelling apparatus of the UAV, the illumination system can provide a visual indication of the UAV (e.g., an outer contour of the UAV or a rotational disk of the propelling apparatus). Accordingly, the operator can effectively learn the status (e.g., orientation, location, flight status, and/or other suitable status) of the UAV in a straight-forward manner. It is especially helpful for unsophisticated or relatively new UAV operators, at least because the discussed technology can help them properly control the UAV.

In some embodiments, an illuminating component in accordance with the present technology can be implemented as a propeller. The propeller can include a light entrance portion configured to receive a light ray in a first direction from the UAV; a light transmission portion positioned to transmit the light ray; and a light exit portion positioned to direct the light ray in a second direction different than the first direction. The second direction can be determined based on the location of an operator of the UAV. The directed light ray can provide the operator with a visual indication that signifies a location, an outer contour, or a rotational disk (e.g., when the propeller is rotating) of the UAV. In some embodiments, the present technology can be implemented as a propelling assembly that has a propeller and a motor assembly coupled to the propeller. The motor assembly is configured to be coupled to a UAV and to rotate the propeller during operation of the UAV.

The present technology also provides a system for indicating a UAV. A representative UAV includes a main body and a propeller coupled to the main body. The system includes: (1) a lighting component carried by the UAV and positioned to emit a light ray in a first direction; and (2) an illuminating component carried by the propeller. The illuminating component includes a light entrance portion, a light transmission portion and a light exit portion. The light entrance portion is positioned to receive the light ray from the lighting component (which can be positioned in/on the main body of the UAV). The light transmission portion (e.g., a light guide or an optical waveguide) is positioned to transmit the light ray to the light exit portion. The light exit portion is positioned to direct the light ray in a second direction different than the first direction. In some embodiments, the system can include additional illuminating component(s) and/or lighting component(s) so as to provide multiple visual indications that can represent different statuses of the UAV.

Some embodiments of the present technology can be implemented as methods for indicating a UAV. Representative methods can include programming a computer-readable medium with instructions that, when executed, (1) receive an instruction from a processor carried by the UAV; (2) in response to the instruction, emit a light ray (e.g., from a lighting component of the UAV) in a first direction; (3) receive, by an illuminating component carried by a propeller of the UAV, the light ray from the lighting component; and (4) when the propeller is rotating, emit, by the illuminating component carried by the propeller, light in a second direction different than the first direction to form a visual indication of the UAV. Methods, apparatuses and systems in accordance with embodiments of the present technology can include any one or a combination of any of the foregoing elements described above.

DETAILED DESCRIPTION

1. Overview

The present technology is directed generally to apparatuses, systems and method for indicating a status of a UAV or a status of a control terminal (e.g., a remote control of the UAV, or a UAV dock). A representative apparatus can includes a propelling apparatus. Examples of the propelling apparatus include a propeller, a blade, a paddle, a rotatable component that can move air/liquid positioned adjacent thereto, and/or other suitable devices. The propelling apparatus can include a light entrance portion positioned/configured to receive a light ray from the UAV. The light entrance portion can be a transparent portion of the propelling apparatus (e.g., a light filtering layer positioned on a surface of the propelling apparatus). The propelling apparatus can further include a light transmission portion positioned/configured to transmit the light ray. The light transmission portion can include a light guide or a reflective component (e.g., a reflective coating, a mirror, and/or other suitable devices) to facilitate transmitting the received light ray. In some embodiments, for example, the light guide can include multiple reflective layers with different refractive indices. In some embodiments, the light transmission portion can include a tubular shape. The light transmission portion can be disposed along a longitudinal axis of the propelling apparatus. The propelling apparatus further includes a light exit portion positioned/configured to direct the light ray in a specific direction toward a target (e.g., an operator of the UAV, a light receiver, a light recorder, and/or other suitable devices). In some embodiments, the light transmission portion, the light transmission portion and the light exit portion are collectively referred to as an illuminating component of the UAV.

By incorporating the present technology in the propelling apparatus of the UAV, the present technology can provide a visual indication of the UAV in a real-time manner when the UAV is in operation. The visual indication can notify/signify a UAV status to the target. Examples of the UAV status include, for example, a location, an orientation, an outer contour, a rotational disk of the propelling apparatus, a travel direction of the UAV, and/or other suitable parameters. The UAV status provides the operator with useful information in a straight-forward manner, which enables the operator to properly and safely operate the UAV.

In some embodiments, the propelling apparatus can be coupled to a motor assembly which provides power to rotate the propelling apparatus.

In some embodiments, the propelling apparatus can absorb light from a light source. The propelling apparatus can include a fluorescent material. In such embodiments, the fluorescent material can absorb light from a light source carried by the UAV and then emit/generate light in a specific direction toward the target.

In some embodiments, the propelling apparatus can include a photoluminescence material. The photoluminescence material can include a fluorescence material, a phosphorescence material, and/or other suitable materials. In an embodiment, a photoluminescence layer can be formed on at least a portion of an outer surface of the propelling apparatus. In another embodiment, the propelling apparatus can be made of mixed materials including a photoluminescence material, such that the outer surface of the propelling apparatus can include a light-absorbing surface.

In some embodiments, the propelling apparatus can transmit light from a light source. The propelling apparatus can include a light guide structure configured to transmit the light from the light source. In an embodiment, the light guide structure can be separately formed and then assembled with a main body of the propelling apparatus. In another embodiment, the light guide structure can be integrally formed with the main body of the propelling apparatus. For example, the main body of the propelling apparatus can be made of a transparent material or a translucent material. In some embodiment, a light-reflecting layer or film can be formed on at least a portion of a surface of the main body, such that the light from the light source can be transmitted in/by the main body.

In some embodiments, the propelling apparatus can carry a light source. In an embodiment, the light source can be positioned on or embedded in the propelling apparatus. In another embodiment, the light source can be positioned on an outer surface of the propelling apparatus.

In some embodiments, the UAV can carry a lighting component as a light source to emit light rays directed to the propelling apparatus. In some embodiments, the UAV can include multiple lighting components and/or multiple propelling apparatuses. The multiple lighting components and the multiple propelling apparatuses can provide one or more combinations of visual indication that can be used to convey different types of UAV information to the target. For example, the lighting component can emit light rays in different colors to indicate different UAV statuses (e.g., normal power, low power, deviation from a planned route, flight altitude, and/or other suitable parameters).

Traditionally, an operator can only view the indication light 105 from a place underneath the UAV 100 (FIG. 1). Unlike conventional systems, embodiments of the present technology enable an operator to observe or receive a visual indication from a wide range of angles, including viewing from a position above the UAV or at a level substantially the same as that of the UAV. The present technology can improve the user experience and/or convenience by providing better and/or more intuitive information.

Furthermore, when the propelling apparatus is rotated, the indication light can be presented as a linear light source or an area light source, such that an operator of the UAV can easily observe the indication light. For example, in an embodiment, the propelling apparatus can carry a point light source, and when the propelling apparatus is rotated, the point light source can be viewed as a substantially ring-shaped light source. In another embodiment, the propelling apparatus can carry a line light source or an area light source. When the propelling apparatus is rotated, the line light source or the area light source can be seen as a substantially ring-shaped light source or a substantially disc-shaped light source.

Several details describing structures or processes that are well-known and often associated with UAVs and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations and/or different components than those described in this section. Accordingly, the technology may have other embodiments with additional elements and/or without several of the elements described below with reference to FIGS. 2A-7.

FIGS. 2A-7 are provided to illustrate representative embodiments of the disclosed technology. Unless provided for otherwise, the drawings are not intended to limit the scope of the claims in the present application.

Many embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any suitable data processor and can include Internet appliances and handheld devices (including palm-top computers, wearable computers, cellular or mobile phones, multi-processor systems, processor-based or programmable consumer electronics, network computers, mini computers, a programmed computer chip, and the like). Information handled by these computers and controllers can be presented at any suitable display medium, including a CRT display or an LCD. Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, or other suitable medium. In particular embodiments, the term "component" can include hardware, firmware, or a set of instructions stored in a computer-readable medium.

2. Representative Embodiments

Figure 2A:
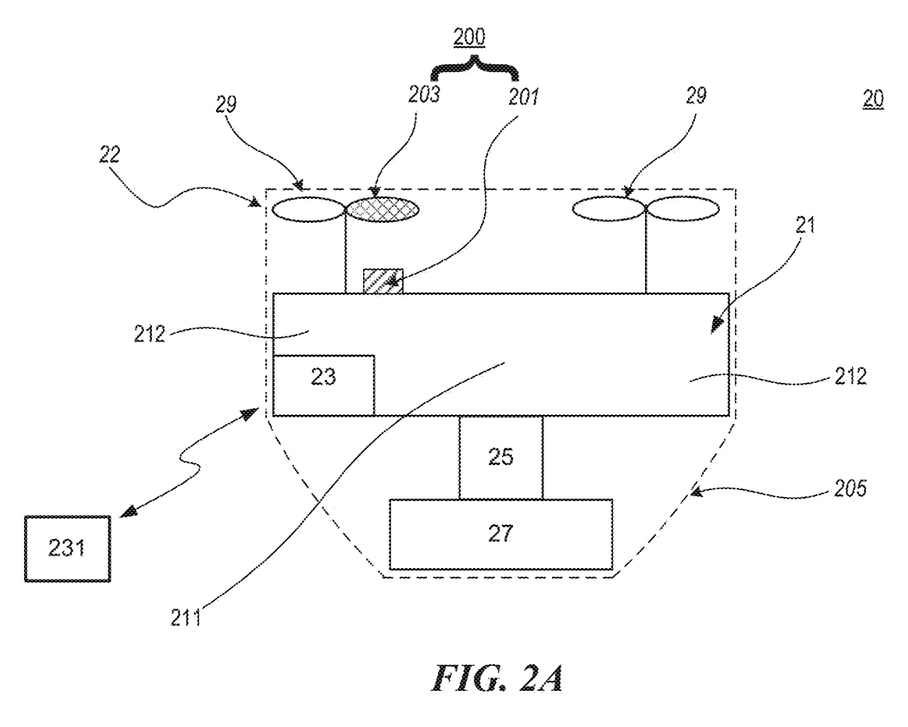
FIG. 2A is a partially schematic side view of a UAV having an illumination system configured in accordance with representative embodiments of the present technology.

FIG. 2A is a partially schematic side view of a UAV 20 having an illumination system 200 configured in accordance with representative embodiments of the present technology. A shown in FIG. 2A, the UAV 20 includes an airframe 21 (or a main body 21), a UAV controller 23 carried by the UAV 20 and configured to control the UAV 20, a gimbal 25 coupled to the airframe 21, and a payload 27 coupled to and carried by the gimbal 25. In some embodiments, the payload 27 can include an image device. In particular embodiments, the imaging device can include an image camera (e.g., a camera that is configured to capture video data, still data, or both). The image camera can be sensitive to wavelengths in any of a variety of suitable wavelength bands, including visual, ultraviolet, infrared or combinations thereof. In still further embodiments, the payload 27 can include other types of sensors, other types of cargo (e.g., packages or other deliverables), or both. In many of these embodiments, the gimbal 25 supports the payload 27 in a way that allows the payload 27 to be independently positioned relative to the airframe 21. Accordingly, for example, when the payload 27 includes an imaging device, the imaging device can be moved relative to the airframe 210 to track a target.

The airframe 21 can include a central portion 211 and one or more outer portions 212. In particular embodiments, the airframe 21 can include four outer portions 212 (e.g., arms) that are spaced apart from each other as they extend away from the central portion 211. In other embodiments, the airframe 21 can include other numbers of outer portions 212. In any of these embodiments, individual outer portions 212 can support one or more components of a propulsion system 22 that drives the UAV 20. For example, individual arms can support corresponding individual motors that drive corresponding propellers 29.

As shown in FIG. 2A, the illumination system 200 includes a lighting component (or a light source) 201 positioned to emit a light ray in a first direction (e.g., toward the propeller 29). In the illustrated embodiment, the lighting component 201 is carried by the airframe 21. In some embodiments, the lighting component 201 can include a light emitting diode (LED), a light-emitting electrochemical cell, an electroluminescent component, a laser, a lamp, a light bulb, and/or other suitable optical devices. The illumination system 200 also includes an illuminating component 203 carried by one of the propellers 29. The illuminating component 203 is positioned to receive the light ray from the lighting component 201 and then emit light in a second direction different than the first direction. Particular examples of the first/second directions will be discussed in detail with reference to FIGS. 2B-4 below.

In some embodiments, the illuminating component 203 can include a light guide structure. The light guide structure can include a light entrance portion configured to receive the light ray from the light source 201, a light transmission portion positioned to transmit the light ray, and a light exit portion positioned to direct the light ray in the second direction. Particular examples of the light entrance/light transmission/light exit portions will be discussed in detail with reference to FIG. 4 below.

In some embodiments, the illuminating component 203 can include a fluorescent material positioned to absorb the light ray from the lighting component 201 and generate/emit another light ray (e.g., with a frequency different than the frequency of the light ray received from the lighting component 201). In some embodiments, the fluorescent material can be coated or otherwise positioned on a lower surface of the propeller 29. In some embodiments, the fluorescent material can be embedded in the propeller 29. In some embodiments, the second direction can be determined based on the location of a target, for example, the UAV operator.

The light emitted from the illuminating component 203 in the second direction forms a visual indication of the UAV 20 that is indicative of a status of the UAV 20. For example, the visual indication can be indicative of an outer contour 205 (or a portion of the outer contour 205) of the UAV 20. Accordingly, the operator can maneuver or control the UAV 20 with a better understanding of where the edges of the UAV 20 are located. In some embodiments, the visual indication is indicative of an orientation of the UAV 20, and/or the travel direction of the UAV 20 (e.g., the direction in which the UAV 20 moves when the operator instructs the UAV 20 to "move forward" via an operator's controller 231). Knowing the travel direction of the UAV 20 is important to UAV operators who observe the UAV 20 while controlling it. In some embodiments, the visual indication can be indicative of another status of the UAV 20 (e.g., normal power, low power, deviation from a planned route, and/or flight altitude). The visual indication provides the operator of the UAV 20 with helpful and useful information when operating the UAV, and may supplement similar information presented at the operator's controller 231.

The operator's controller 231 communicates with the UAV controller 23. In some embodiments, the UAV controller 23 can include a processor and a storage component. The processor can be configured to control other components of the UAV 20. The storage component can be configured to, permanently or temporarily, store information associated with the UAV 20. In particular embodiments, the storage component 102 can include a computer-readable medium, a disk drive, a hard disk, a flash drive, a memory, or the like.

Figure 2B:
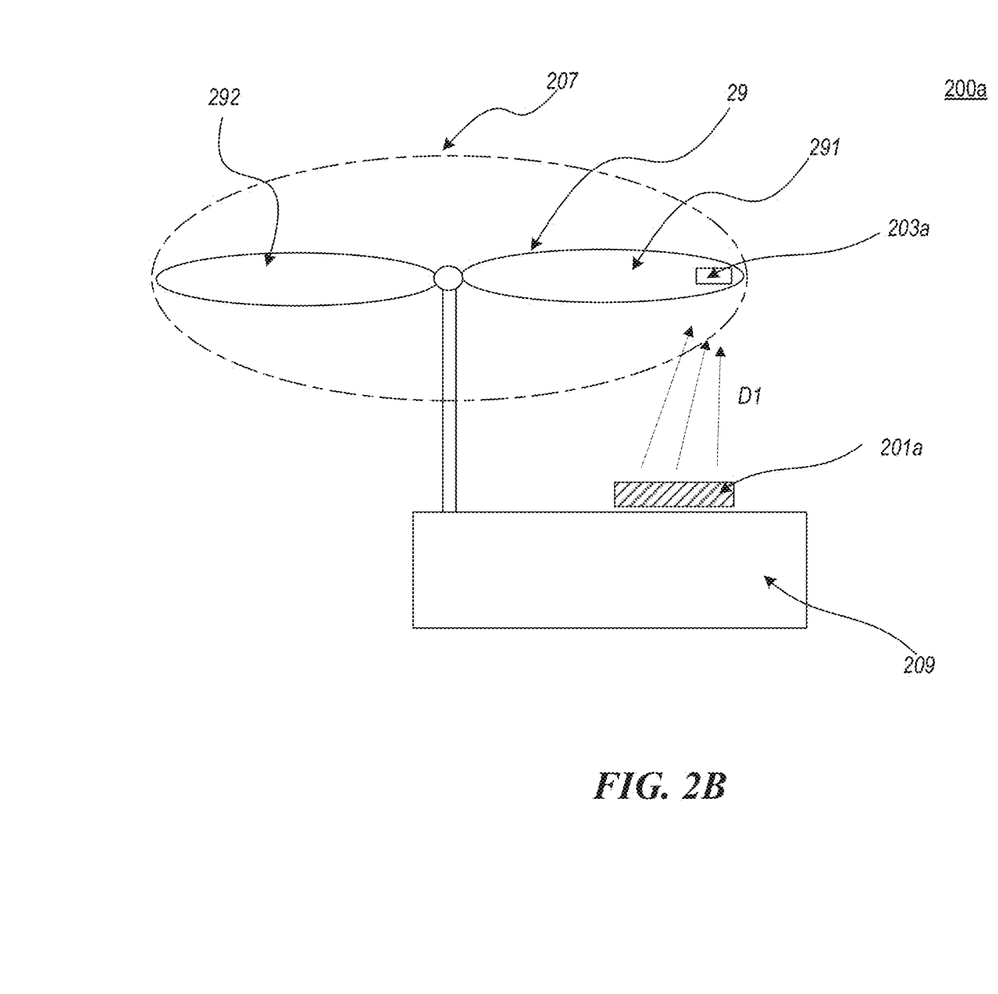
FIGS. 2B and 2C are partially schematic side views of an illumination system configured in accordance with representative embodiments of the present technology.
Figure 2C:
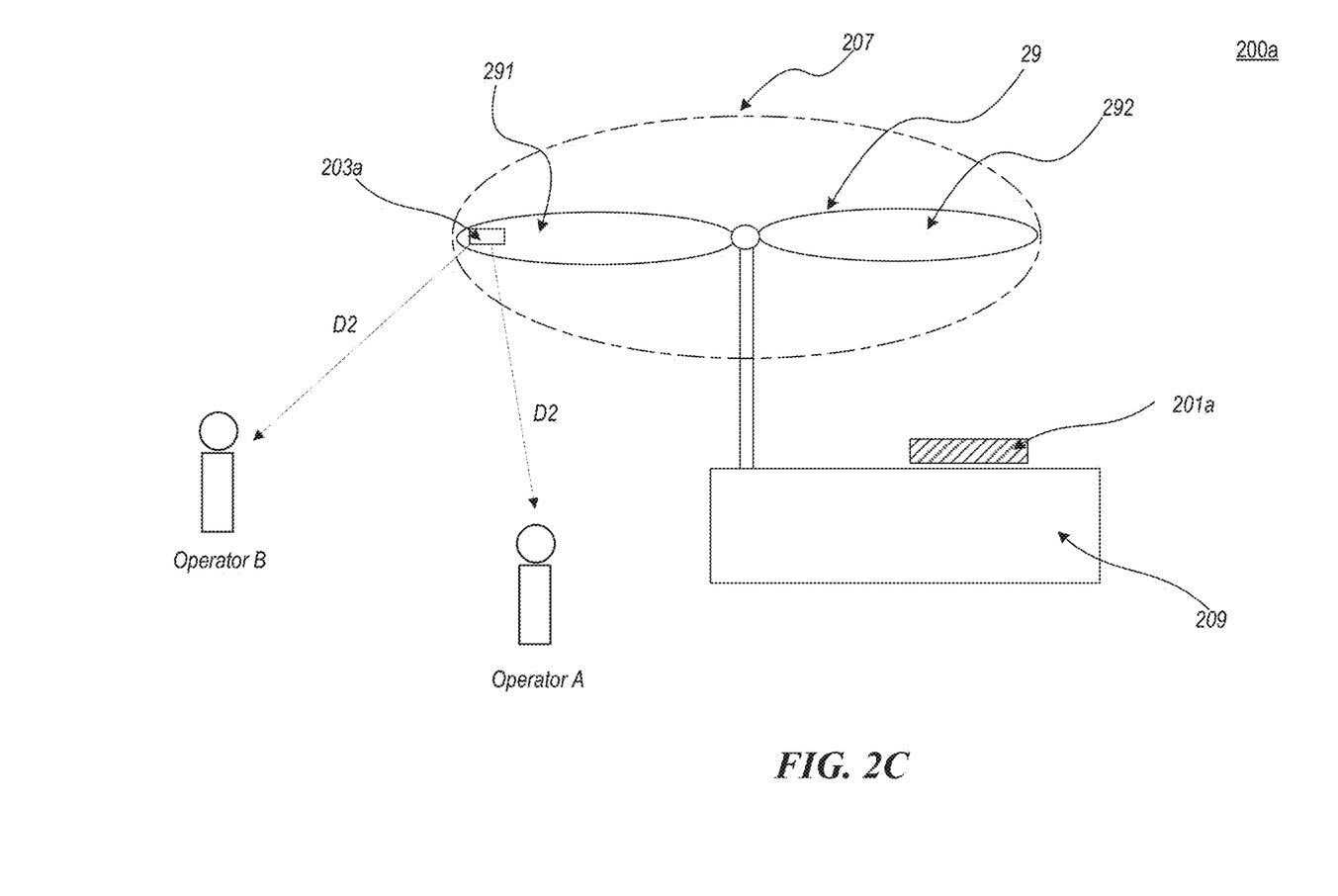

FIGS. 2B and 2C are schematic diagrams illustrating an illumination system 200*a* configured in accordance with representative embodiments of the present technology. The illumination system 200*a* includes a light source 201*a* carried by an arm 209 of the UAV 20. The light source 201*a* is positioned to emit a light ray in a first direction D1. The illumination system 200*a* further includes an illuminating component 203*a* (e.g., a fluorescent material) positioned on/in a first blade 291 of the propeller 29. The propeller 29 further includes a second blade 292 positioned opposite to the first blade 291. When the propeller 29 is rotating, edges of the first/second blades 291, 292 together define a rotational disk 207.

As shown in FIG. 2B, the illuminating component 203*a* receives the light rays from the light source 201*a*. In the illustrated embodiment, the light source 201*a* emits multiple light rays that focus on the illuminating component 203*a*. In other embodiments, the light source 201*a* can emit generally parallel light rays toward the illuminating component 203*a*. As shown in FIG. 2C, the illuminating component 203*a* can absorb the light rays as the illuminating component 203*a* rotates to a different location. The illuminating component 203*a* can then emit light (e.g., light at a different frequency) in any of a number of second directions D2. Accordingly, one or more operators (shown as operator A and operator B) see the emitted light. Accordingly, the system 200*a* can provide a visual indication of a status of the UAV 20 to operators A or B. In the illustrated embodiment, operators A and B are both located below the UAV 20. In other embodiments, the operators can have other positions relative to the UAV 20.

Figure 3:
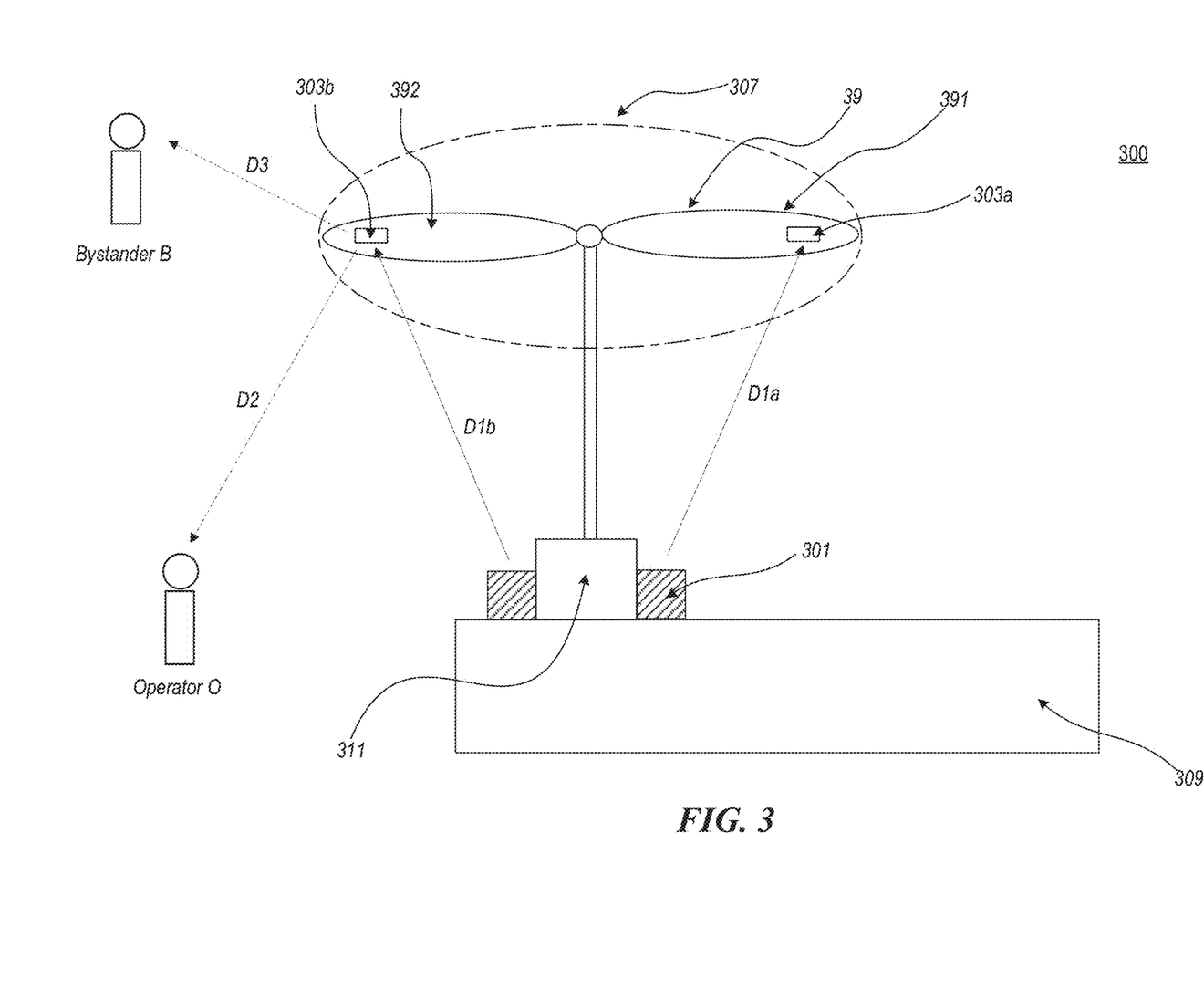
FIG. 3 is a partially schematic side view of an illumination system configured in accordance with representative embodiments of the present technology.

FIG. 3 is a partially schematic side view of an illumination system 300 configured in accordance with representative embodiments of the present technology. The illumination system 300 includes an annular light source 301 surrounding (or at least partially surrounding) a motor assembly 311. The annular light source 301 is carried by an arm 309 of a UAV. The motor assembly 311 is coupled to a propeller 39 to rotate it. The propeller 39 can include a first blade 391 and a second blade 392 opposite to the first blade 391, or have another suitable blade arrangement. When the propeller 39 is rotated by the motor assembly 311, one or more edges of the first/second blades 391, 392 together define a rotational disk 307. For example, multiple edges of both blades can emit light, or a single edge of a single blade (e.g., at the tip of the blade) can emit light. In still further embodiments, any suitable surface(s) of the blade(s), not limited to the edges, can emit light. The annular light source 301 can be positioned to direct multiple light rays toward the propeller 39. The multiple light rays can be emitted in multiple directions, two of which (D1*a* and D1*b*) are shown in FIG. 3 as an example.

As shown in FIG. 3, the illumination system 300 further includes a first illuminating component 303*a* positioned on/in the first blade 391 and a second illuminating component 303*b* positioned on/in the second blade 392. In some embodiments, the first and second illuminating components 303*a*, 303*b* can be positioned at edges of the propeller 39. The first illuminating component 303*a* receives the light rays from the annular light source 301 (as indicated by direction D1*a*), and at the same time the second illuminating component 303*b* receives the light rays from the annular light source 301 (as indicated by direction D1*b*). Via this arrangement, the first and second illuminating components 303*a*, 303*b* can continuously receive light from the annular light source 301 when the propeller 39 is rotating. After receiving light from the annular light source 301, the first and second illuminating components 303*a*, 303*b* can then emit the received light toward a target so as to form a visual indication (e.g., one or more light rings when the propeller 39 is rotating). For example, as shown in FIG. 3, the second illuminating component 303*b* can emit light toward operator O in direction D2 and/or toward a bystander B in direction D3. In the illustrated embodiment, operator O is located below the second illuminating component 303*b* and bystander B is located above the second illuminating component 303*b* (e.g., bystander B can be observing the UAV from a tall building). In other embodiments, the bystander B and/or operator O can be located at other locations relative to the UAV.

Figure 4:
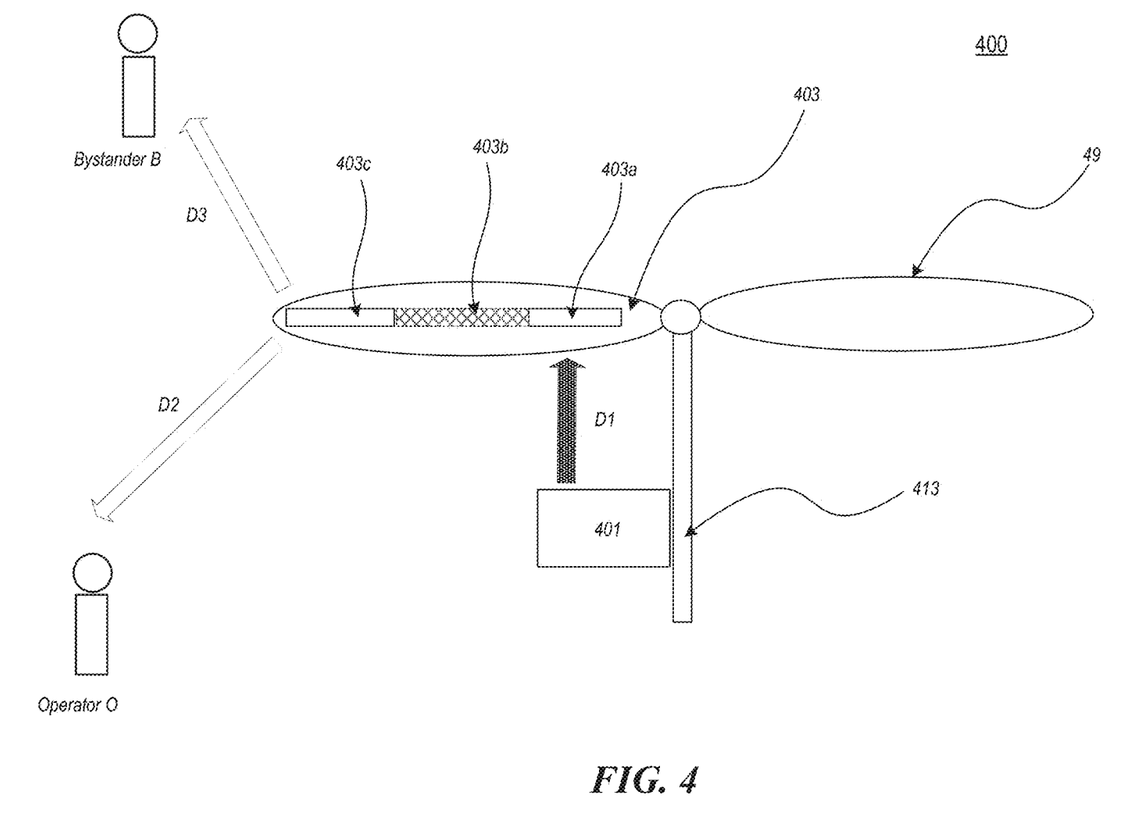
FIG. 4 is a partially schematic side view of an illumination system configured in accordance with representative embodiments of the present technology.

FIG. 4 is a partially schematic side view of an illumination system 400 configured in accordance with representative embodiments of the present technology. The illumination system 400 includes a lighting component 401 attached to a shaft 413 which carries a propeller 49. The shaft 413 can be coupled to and carried by a UAV. The lighting component 401 is positioned to emit multiple light rays toward the propeller 49. The multiple light rays can be emitted in one or more directions, with only one direction D1 shown in FIG. 4 for purposes of illustration.

The illumination system 400 further includes an illuminating component 403 positioned on or embedded in the propeller 49. In some embodiments, the illuminating component 403 and the propeller 49 can be integrally formed. In some embodiments, the illuminating component 403 includes a light guide structure. In the illustrated embodiment, the illuminating component 403 includes (1) a light entrance portion 403*a* configured/positioned to receive a light ray from the lighting component 401; (2) a light transmission portion 403*b* configured/positioned to transmit the light ray; and (3) a light exit portion 403*c* configured/positioned to direct the light ray toward a target, such as the operator O and/or the bystander B, in one or more directions (e.g., directions D2 and D3). In some embodiments, the light entrance portion 403*a* is optically accessible from below the propeller 49.

In some embodiments, the light entrance portion 403*a* can include a transparent portion configured to receive incoming light rays. The light entrance portion 403*a* can include a hollow portion and/or a solid portion configured to receive incoming light rays. The hollow portion can define a hole for receiving incoming light rays. The solid portion can be made of a transparent glass, a translucent glass, a transparent plastic, a translucent plastic, and/or other suitable materials.

In some embodiments, the light transmission portion 403*b* is positioned between the light entrance 403*a* and the light exit portion 403*c*. The light transmission portion 403*b* can include a light guide component/structure, a light-reflective component, and/or other suitable optical components. The light guide component can be made of a transparent material or a translucent material. For example, the light guide component may be made of a transparent glass, a translucent glass, a transparent plastic, a translucent plastic, and/or other suitable materials. In an embodiment, the light guide component can include an optical fiber, an optical film, and/or an optical lens. In another embodiment, the light guide component can be a light-receiving film, a light-reflective film, a light-reflective tube, and/or other suitable components.

In some embodiments, the light exit portion 403c can be positioned to direct light outwardly relative to the propeller 49 (e.g., the light exit portion 403c can be positioned at a tip or other edge of the propeller 49). In some embodiments, the light exit portion 403c can be positioned to direct light upwardly relative to the propeller 49 (e.g., the light exit portion 403c can be positioned at an upper surface of the propeller 49). In some embodiments, the light exit portion 403c can be positioned to direct light downwardly relative to the propeller 49 (e.g., the light exit portion 403c can be positioned at a lower surface of the propeller 49).

In some embodiments, the light exit portion 403c can include a transparent portion configured to emit outgoing light rays. In some embodiments, the transparent portion can include a light filter or a light filtering layer. In some embodiments, the transparent portion can be made of plastic, glass, and/or other suitable materials. The light exit portion 403c can include a hollow portion and/or a solid portion. The hollow portion can define a hole for emitting outgoing light rays. The solid portion can be made of a transparent material or a transparent material.

Figure 5A:
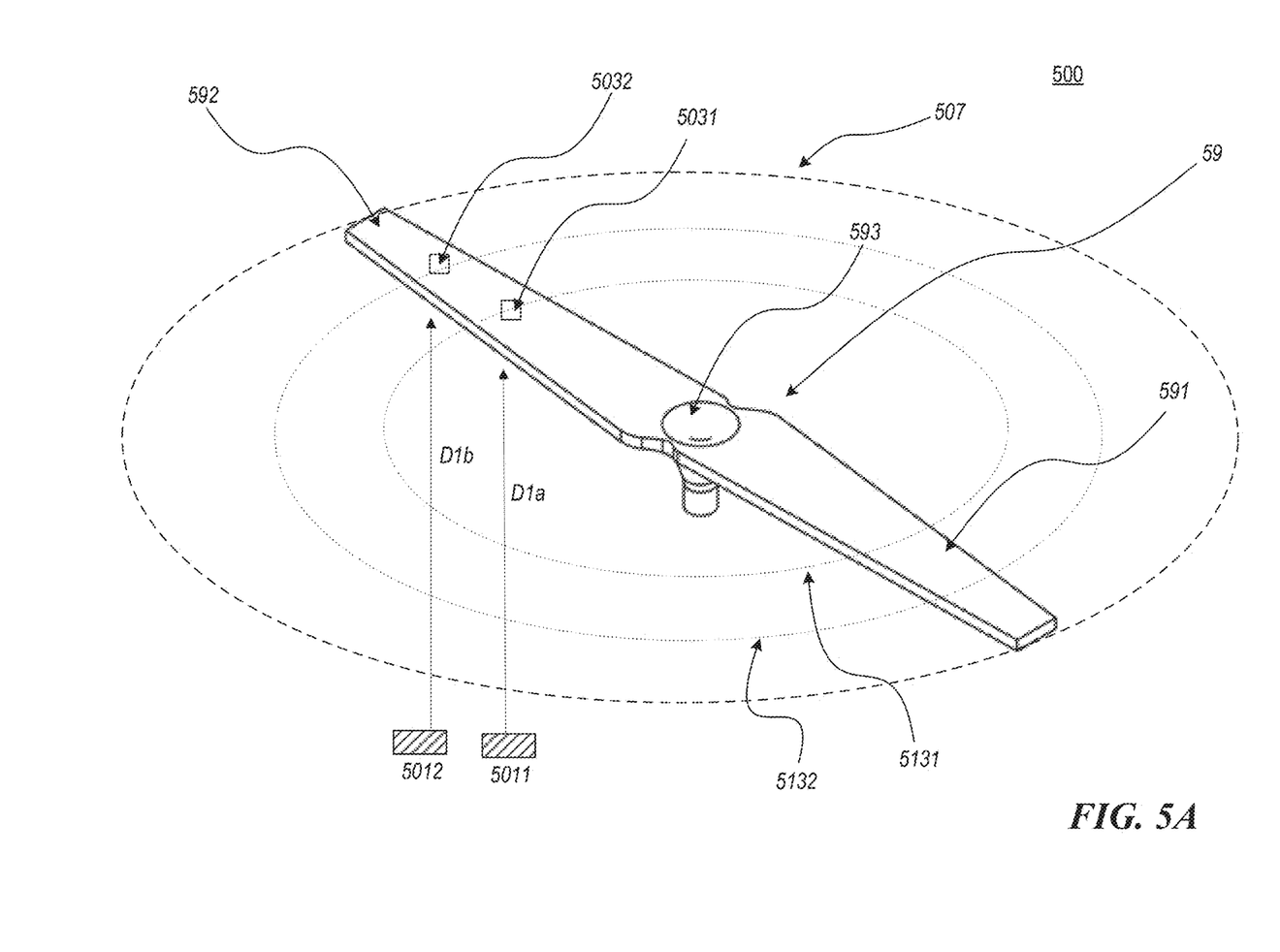
FIG. 5A is a partially schematic isometric view of a propeller having elements of an illumination system configured in accordance with representative embodiments of the present technology.

FIG. 5A is a partially schematic isometric view of a propeller 59 having elements of an illumination system 500 configured in accordance with representative embodiments of the present technology. In the illustrated embodiment, the illumination system 500 includes a first light source 5011, a second light source 5012, a first illuminating component 5031, and a second illuminating component 5032. In other embodiments, the illumination system 500 can include multiple light sources and/or multiple illuminating components. As shown, the first and second illuminating components 5031, 5032 are positioned on or in the propeller 59. In the illustrated embodiment, the propeller 59 includes a first blade 591, a second blade 592 and a hub 593. When the propeller 59 is rotating, edges of the first/second blades 591, 592 together define a rotational disk 507. As shown in FIG. 5A, the first and second illuminating components 5031, 5032 are carried by the second blade 592. In other embodiments, the first and second illuminating components 5031, 5032 can be carried by the first blade 591.

In the illustrated embodiment, the first illuminating component 5031 can receive light from the first light source 5011 (in direction D1a) and the second illuminating component 5032 can receive light from the second light source 5012 (in direction D1b). The first/second illuminating components 5031, 5032 can then generate light to form a visual indication. In the illustrated embodiment shown in FIG. 5A, when the propeller 59 is rotating, the light emitted from the first/second illuminating components 5031, 5032 together form the visual indication, which includes two light rings 5131, 5132. In some embodiments, the light rings 5131, 5132 can have different colors, brightness, light blink frequency, and/or other suitable optical characteristics. Accordingly, the illumination system 500 can provide multiple combinations of visual indications that signify or indicate different UAV statuses. For example, two white light rings can represent a normal condition, and two red light rings represent an abnormal condition (e.g., a low power level for the UAV). As another example, a white ring with a blinking red ring can represent a warning (e.g., indicating that the UAV is too close to an obstacle).

In some embodiments, the first/second light sources 5011, 5012 can be controlled by a processor coupled thereto. In some embodiments, the first/second light sources 5011, 5012 can be a single light source. In some embodiments, the direction of light emitted from the single light source can be adjustable. For example, in response to a first condition (e.g., normal), a processor coupled to the single light source can instruct it to emit light toward the first illuminating component 5031. Similarly, in response to a second condition (e.g., abnormal), the processor can instruct the single light source to emit light toward the second illuminating component 5032.

Figure 5B:
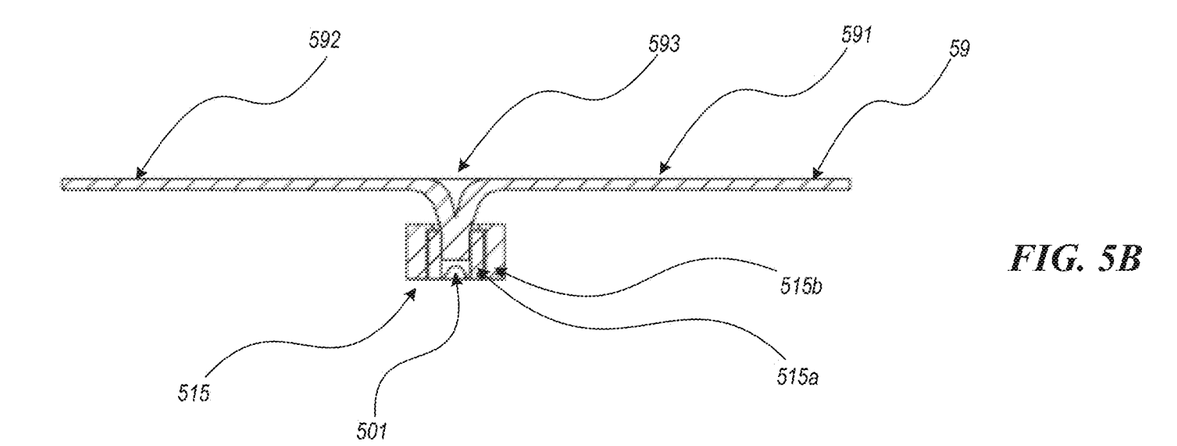
FIGS. 5B and 5C are partially schematic side views of a propeller configured in accordance with representative embodiments of the present technology.
Figure 5C:
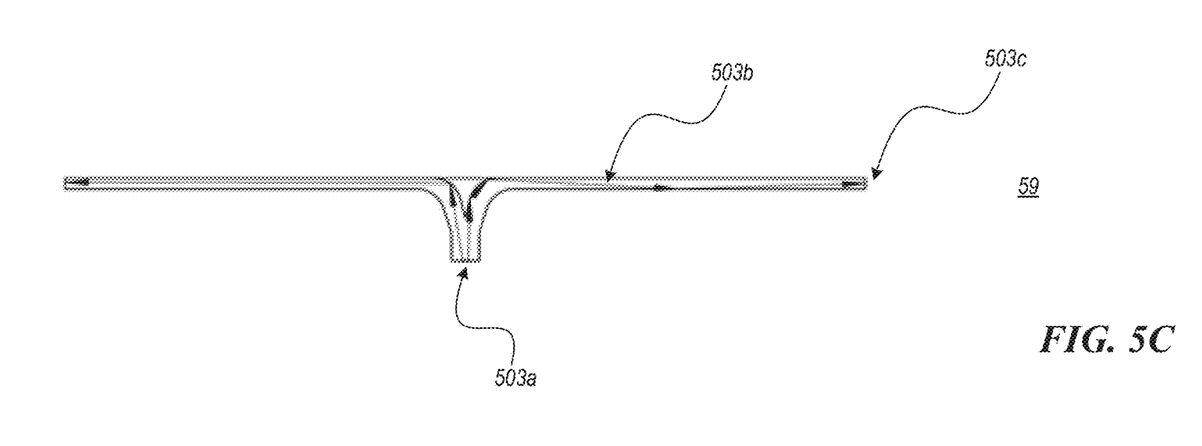

FIGS. 5B and 5C are partially schematic side views of a propeller 59 configured in accordance with representative embodiments of the present technology. In the embodiments shown in FIGS. 5B and 5C, the propeller 59 is also an illuminating component 503. For example, the propeller 59 and the illuminating component 503 can be integrally formed as a single component. As shown in FIG. 5B, the propeller 59 can include a first blade 591, a second blade 592 and a hub 593. In an embodiment, the propeller 59 can have a hollow structure that enables light to be transmitted therein. In another embodiment, the propeller 59 can have a transparent structure or a translucent structure that enables light to be transmitted therein.

As shown in FIG. 5B, the hub 593 is coupled to a lighting component 501 so as to receive light therefrom. The hub 593 can be further coupled to a rotor assembly 515. The rotor assembly 515 includes a first portion 515a and a second portion 515b. The second portion 515b can be positioned around the first portion 515a. In some embodiment, the first portion 515a can define a hole to accommodate the hub 593 and the lighting component 501. The propeller 59 is coupled to the first portion 515a or the second portion 515b. The rotor assembly 515 can include a motor, a bearing, a slip ring, or other suitable rotor structures. The motor can include an inner rotor motor or an outer rotor motor.

In an embodiment, the first portion 515a can be a rotor portion, and the second portion 515b can be a stationary portion. The first portion 515a is coupled to the hub 593 and a motor assembly (not shown in FIG. 5B). The second portion 515b can be further coupled to an arm of a UAV and provide structure support for the propeller 59. When the propeller 59 is rotated with the first portion 515a (e.g., driven by the motor assembly), the propeller 59 can form a visual indication to show a status of a UAV to a target.

In another embodiment, the first portion 515a can be a stationary portion, and the second portion 515b can be a rotor portion. The second portion 515b is coupled to the hub 593. The first portion 515a can be further coupled to an arm of a UAV and provide structure support for the propeller 59. When the propeller 59 is rotated with the second portion 515b, the propeller 59 can form a visual indication to show a status of a UAV to a target.

In FIG. 5C, the propeller 59 includes (1) a light entrance portion 503a located at the hub 593 of the propeller 59, (2) a light transmission portion 503b located at the first/second blades 591, 592 (and at the hub 593, in some embodiments), and (3) a light exit portion 503c located at one end (or both ends) of the propeller 59. The propeller 59 (with the integrally formed illuminating component 503) is configured to receive light from the light entrance portion 503a, direct/transmit the received light by the light transmission portion 503b, and then emit the received light from the light exit portion 503c to a target outside the propeller 59. Arrows inside the illuminating component 503 in FIG. 5C illustrate a few examples of the light paths traveled by the light inside the illuminating component 503.

Figure 6:
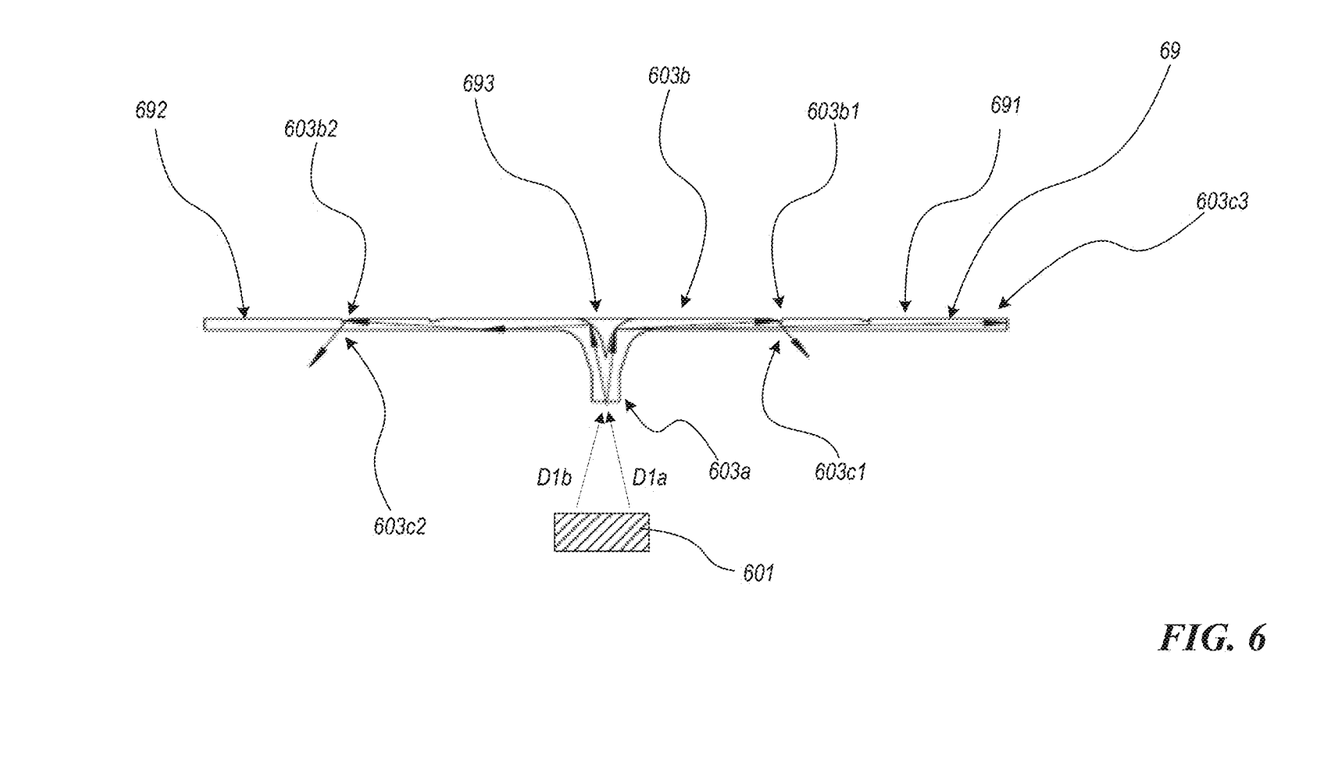
FIG. 6 is a partially schematic side view of a propeller configured in accordance with representative embodiments of the present technology.

FIG. 6 is a partially schematic side view of a propeller 69 configured in accordance with representative embodiments of the present technology. In the embodiments shown in FIG. 6, the propeller 69 is also an illuminating component 603. For example, the propeller 69 and the illuminating component 603 can be integrally formed as a single component. As shown in FIG. 6, the propeller 69 can include a first blade 691, a second blade 692 and a hub 693. The propeller 69 can have a hollow structure, a transparent structure, or a translucent structure that enables light to be transmitted therein. In FIG. 6, the propeller 69 includes (1) a light entrance portion 603a located at the hub 693 of the propeller 69, (2) a light transmission portion 603b located at the first/second blades 691, 692, (3) a first light exit portions 603c1 located at the first blade 691, (4) a second light exit portions 603c2 located at the second blade 692, and (5) a third light exit portion 603c3 located at an end (or both ends) of the propeller 69. In the illustrated embodiment, the light transmission portion 603b includes (1) a first reflective portion 603b1 configured to direct light toward the first light exit portion 603c1, and (2) a second reflective portion 603b2 configured to direct light toward the second light exit portion 603c2.

The propeller 69 (with the integrally formed illuminating component 603) is configured to receive light from the light entrance portion 603a, direct/transmit the received light by the light transmission portion 603b, and then emit the received light from the first light exit portions 603c1, the second light exit portion 603c2, and/or the third light exit portion 603c3 to targets outside the propeller 69. Arrows inside the illuminating component 603 in FIG. 6 illustrate a few examples of the light paths traveled by the light inside the illuminating component 603.

In some embodiments, a light source 601 can be positioned adjacent to the light entrance portion 603a and configured to emit light thereto. In some embodiments, the direction of the light emitted by the light source 601 can be adjustable. For example, the light source 601 can emit light in direction D1a such that the emitted light can be directed to the second light exit portion 603c2. As another example, the light source 601 can emit light in direction D1b such that the emitted light can be directed to the first light exit portion 603c1 and the third light exit portion 603c3. In some embodiments, the location of the light source can be adjustable such that it can emit light in different directions.

In the illustrated embodiment, the first/second light exit portions 603c1, 603c2 are positioned to direct light downwardly relative to the propeller 69. In some embodiments, the first/second light exit portions 603c1, 603c2 can be positioned at different locations of the first/second blades 691, 692. For example, the first/second light exit portions 603c1, 603c2 can be positioned to direct light upwardly relative to the propeller 69.

Figure 7:
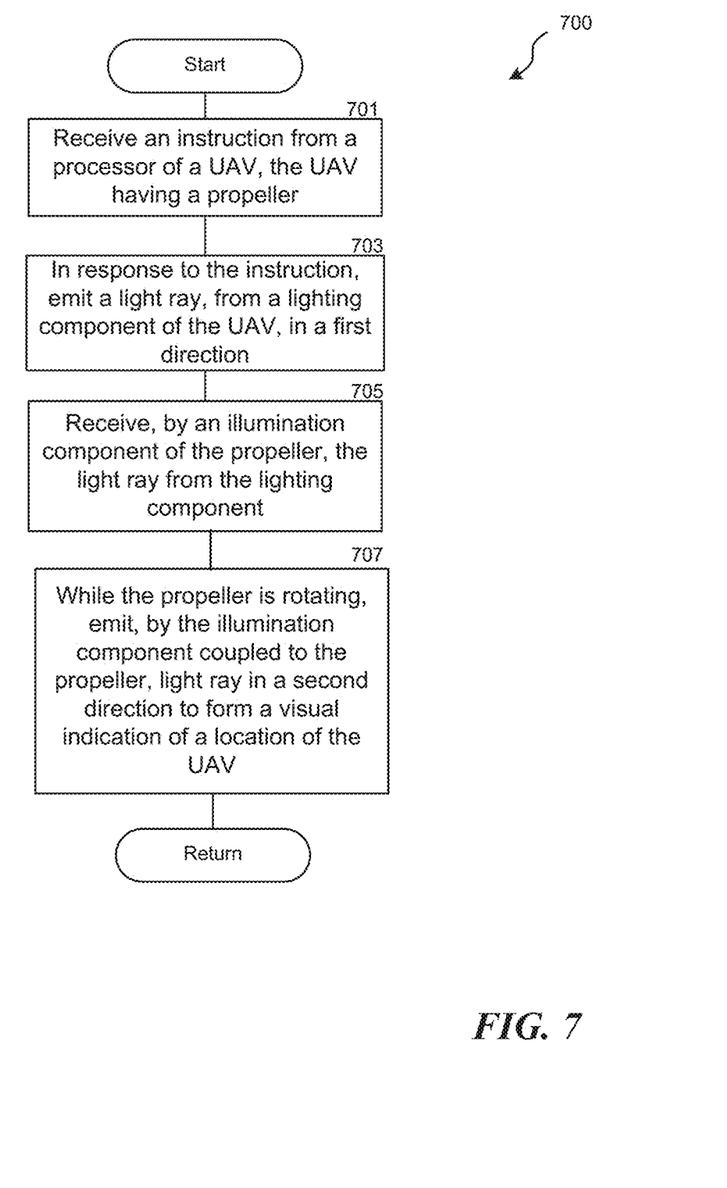
FIG. 7 is a flowchart illustrating a method configured in accordance with representative embodiments of the present technology.

FIG. 7 is a flowchart illustrating a method 700 configured in accordance with representative embodiments of the present technology. The method 700 can be initiated by a request from an operator of a UAV. The UAV can include a propeller and a main body. The UAV also includes an illumination system and a processor. The illumination system includes a lighting component and an illuminating comment. In some embodiments, the illuminating component can be positioned at the propeller. In other embodiments, the illuminating component and the propeller can be integrally formed as a single component. At block 701, the method 700 includes receiving an instruction from the processor of the UAV. At block 703, the lighting component, in response to the request, emits a light ray in a first direction, e.g., toward the illuminating component. At block 705, the illuminating component receives the light ray from the lighting component. At block 707, the illuminating component emits light in a section direction (different than the first direction), as a visual indication which is directed to a target. The method 700 then includes returning to wait for further instructions. As discussed above, in some embodiments, the visual indication can include an outer contour of the UAV. In some embodiments, the visual indication can be indicative of a location of the UAV (or a location of a UAV component). In some embodiments, the visual indication can be indicative of another status/parameter of the UAV (e.g., travel direction, orientation, and/or flight status).

From the foregoing, it will be appreciated that specific embodiments of the technology have been described herein for purposes of illustration, but that various modifications may be made without deviating from the technology. For example, particular embodiments were described above in the context of a UAV. In other embodiments, the present technology can be implemented by other suitable moveable devices that include propelling apparatus, such as an unmanned ground vehicle (UGV), an unmanned surface vehicle (USV), or a robot. As another example, the direction of light emitted from the light source(s) described can be adjusted either automatically (e.g., by a processor according to a set of predetermined instructions) or manually (e.g., an operator may instruct the indication system to generate a specific type of visual indication to convey particular information to a bystander). In some embodiments, the direction of the light emitted from the light source(s) can be adjusted based on the location of the operator (which can be determined, for example, by the location of the operator's controller 231 measured by a location sensor) and the location of the indication system (e.g., which can be measured by another location sensor). For example, the indication system can adjust the direction of light emitted from the light source(s) so as to generate a visual indication viewable by the operator.

Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. A propelling apparatus for an unmanned aerial vehicle (UAV), the propelling apparatus comprising:
a light entrance portion configured to receive a light ray from a light source coupled to the UAV;
a light exit portion configured to direct the light ray away from the propelling apparatus; and
a light transmission portion connecting the light entrance portion and the light exit portion and configured to transmit the light ray from the light entrance portion toward the light exit portion through an interior of the propelling apparatus, wherein the light entrance portion, the light exit portion, and the light transmission portion are located within the propelling apparatus.

2. The propelling apparatus of claim 1, wherein the propelling apparatus is a propeller, and wherein the light entrance portion, the light transmission portion and the light exit portion together form at least part of the propeller.

3. The propelling apparatus of claim 2, wherein the light exit portion is positioned to direct light outwardly relative to an edge of the propelling apparatus.

4. The propelling apparatus of claim 2, wherein the light exit portion is positioned to direct light upwardly relative to the propelling apparatus.

5. The propelling apparatus of claim 2, wherein the light exit portion is positioned to direct light downwardly from the propelling apparatus.

6. The propelling apparatus of claim 2, wherein the light transmission portion includes at least one of a light guide component or a light-reflective component, and wherein the light transmission portion includes a tubular shape and is disposed along a longitudinal axis of the propelling apparatus.

7. A system for indicating an unmanned aerial vehicle (UAV), the system comprising:
  an airframe;
  a light source positioned to emit a light ray in a first direction;
  a motor assembly disposed on the airframe; and
  a propeller coupled to the motor assembly, the propeller further comprising:
    a light entrance portion configured to receive the light ray from the light source;
    a light transmission portion positioned to transmit the light ray through an interior of the propeller; and
    a light exit portion positioned to direct the light ray in a second direction different than the first direction,
    wherein the light entrance portion, the light exit portion, and the light transmission portion are located within the propeller.

8. The system of claim 7, wherein the light source is carried by the motor assembly.

9. The system of claim 7, wherein the first direction is adjustable during operation of the UAV.

10. The system of claim 7, wherein the first direction corresponds to an orientation of the light entrance portion.

11. The system of claim 7, wherein the light entrance portion comprises at least one of a solid portion or a hollow portion configured to receive incoming light rays, the solid portion being made of a transparent material or a translucent material, the hollow portion defining a hole.

12. The system of claim 7, wherein the light exit portion includes a transparent portion of the propeller.

13. The system of claim 7, wherein the light transmission portion includes at least one of a light guide component or a light-reflective component, and wherein the light transmission portion has a tubular shape and is disposed along a longitudinal axis of the propeller.

14. The system of claim 7, wherein the light source has an annular structure.

15. The system of claim 7, wherein the light source is configured to generate the light ray in a first color under a first predetermined condition, and wherein the light source is configured to generate the light ray in a second color under a second predetermined condition.

16. The system of claim 15, wherein the first predetermined condition corresponds to a normal status of the UAV, and where the second predetermined condition corresponds to an abnormal status of the UAV.

17. A system for indicating an unmanned aerial vehicle (UAV), the UAV having a main body and a propeller coupled to the main body, the system comprising:
  a light source carried by the UAV and positioned to emit a light ray in a first direction; and
  an illuminating component carried by the propeller and having a light entrance portion, a light transmission portion, and a light exit portion, the light entrance portion being positioned to receive the light ray from the light source, the light transmission portion being positioned to transmit the light ray to the light exit portion through an interior of the propeller, and the light exit portion being positioned to direct the light ray in a second direction different than the first direction, wherein the light entrance portion, the light exit portion, and the light transmission portion are located within the propeller.

18. The system of claim 17, wherein the light exit portion is positioned to direct light outwardly relative to an edge of the propeller.

19. The system of claim 17, wherein:
  the illuminating component is a first illuminating component;
  the light ray is a first light ray;
  the system further comprises a second illuminating component carried by the propeller;
  the light source is positioned to emit a second light ray to the second illuminating component; and
  the second illuminating component is positioned to receive the second light ray and direct the second light ray in a third direction.

20. The system of claim 17, wherein the light source is configured to generate the light ray in a first color under a first predetermined condition, and wherein the light source is configured to generate the light ray in a second color under a second predetermined condition.

* * * * *